United States Patent [19]

Kelly et al.

[11] 3,887,714

[45] June 3, 1975

[54] PROCESS FOR PREPARING INSTANT CEREALS AND THE RESULTING PRODUCT

[75] Inventors: Vincent J. Kelly; Wayne Smalligan, both of Fremont, Mich.

[73] Assignee: Gerber Products Company, Fremont, Mich.

[22] Filed: Dec. 6, 1973

[21] Appl. No.: 422,481

[52] U.S. Cl. .................... 426/72; 426/619; 426/74; 426/625; 426/457
[51] Int. Cl. .............................................. A23l 1/18
[58] Field of Search ............ 426/152, 367, 457, 74, 426/142

[56] References Cited
UNITED STATES PATENTS

| | | | |
|---|---|---|---|
| 2,928,743 | 3/1960 | Rutgers | 426/457 |
| 3,235,391 | 2/1966 | Dorsey | 426/457 |
| 3,241,978 | 3/1966 | Hreschak | 426/457 |
| 3,520,695 | 7/1970 | Hansen et al. | 426/142 |
| 3,704,134 | 11/1972 | Ronai et al. | 426/457 |

*Primary Examiner*—Raymond N. Jones
*Attorney, Agent, or Firm*—Townsend and Townsend

[57] ABSTRACT

Instant type grain cereals are provided which are rapidly reconstituted into smooth, uniform porridges and are substantially free of other than the specific grain cereal and desirable food supplements, e.g., iron and vitamins and, optionally, fruit. A mixture of a minor amount of pregelatinized flakes of the cereal is combined with a major amount of quick cooking cereal flakes which, upon the addition of boiling water, is reconstituted to a uniform, desirably textured and flavored product.

7 Claims, No Drawings

PROCESS FOR PREPARING INSTANT CEREALS AND THE RESULTING PRODUCT

BACKGROUND OF THE INVENTION

1. Field of the Invention

Among the many convenience foods are the so-called instant or pre-cooked varieties. Included in this group of convenience foods are the hot instant cereals which do not require cooking but are prepared ready to eat by the addition of boiling water in a prescribed amount.

The original processes for preparing instant cereals, for example, oats, found that merely steaming and rolling an ordinary oat resulted in a product which had a raw, uncooked flavor and a coarse texture, not at all like cooked oatmeal. The product was therefore considered commercially unacceptable, and various methods were devised for improving the texture, taste, appearance and the like of the commonly accepted cooked porridge.

With many cereals, it is desirable to have a sweet fruit flavoring, such as bananas, strawberries, apples or the like. With some fruits it can be provided by the addition of small fruit bits. But, frequently, a completely uniform and homogeneous distribution of the bits will not occur. In other instances, the fruit cannot be conveniently added as individual bits. It would, therefore, be advantageous to have a method whereby various fruits could be uniformly distributed through the porridge.

2. Description of the Prior Art

U.S. Pat. Nos. 2,999,018 and 3,704,134 add an edible polysaccharide gum or an edible pregelatinized starch component to rolled oats to enhance porridge quality. U.S. Pat. No. 3,520,695 adds starch during the processing of the oats to improve the porridge quality. U.S. Pat. No. 3,506,447 describes a process for preparing a dehydrated reconstitutable fruit cereal, which disclosure is incorporated herein by reference, to the extent that it teaches the production of a fruit-cereal flake.

SUMMARY OF THE INVENTION

Instant type cereals are provided by combining a mixture of pregelatinized cereal flakes, containing food supplements and, optionally fruit, with a major amount of a quick cooking cereal flake, and dry blended to form a homogeneous mixture. The flakes are substantially the same size and do not segregate during storage and handling. Upon reconstitution with steaming water, a commercially acceptable porridge is obtained, having the desired flavor and texture of a cooked cereal.

DESCRIPTION OF THE SPECIFIC EMBODIMENTS

A uniform grain cereal of instant type is provided which, upon reconstitution with boiling water, is of a uniform texture and desirable flavor. A quick cooked cereal flake in major amount is combined with a minor amount of a pregelatinized grain cereal flake, minor amounts of natural flavoring agents and food supplements and, optionally, a fruit. The two are dry blended to provide a uniform mixture of the desired grain cereal substantially free of materials having little, if any, food value. While various grains can be employed, oats and wheat are the most popular grains for instant cereals. Therefore, the subject invention will be exemplified by these cereal grains.

The quick cooking oat flakes are prepared by conventional procedures which have appeared in a number of patents, e.g., U.S. Pat. Nos. 3,520,695 and 3,704,134.

In one method, oat bits are allowed to pass downwardly through a laterally tapering long vessel, whose lower walls are inclined inwardly so as to feed the oat bits to a grooved roller which feeds the oat bits between flaking rollers. The oat bits are fed at a rate so as to keep the steamer vessel filled. Steam pipes, which extend downwardly through the vessel, have openings near the central portion of the vessel so that steam is brought in contact with the oat bits as they move downwardly through the vessel. Ordinarily, the oats are steamed in the vessel for about 8 to 10 minutes. After flaking, the product is quick oats or baby oats, depending on the degree of fineness of the flakes.

Various pre-treatments of the oats includes dehulling oats, steel-cutting the resultant groats, and the like. The treatment may include both dehydration and hydration steps. Desirably, the final oats will vary in size from about 0.05 to about 0.25 inch cross section.

The quick cooking wheat flake is prepared in substantially the same manner as the oat flake, which is considered to be representative of cereal flakes generally.

The pregelatinized base flake will normally be made from the appropriate cereal flour and a mineral supplement. Salts, such as sodium chloride, calcium phosphate or calcium carbonate, and other minor additives including malt, vitamins, phosphatides, e.g. lecithin, vegetable oils, food acids, and the like may be included. Optionally, a major amount of a fruit puree may be added, such as bananas, prunes, strawberries, apples and the like.

Conveniently, a mixture containing about 80 to 95 weight percent of the appropriate grain cereal flour, from about 2 to 10 weight percent, more conveniently from about 4 to 8 weight percent of a mineral supplement such as calcium carbonate, and from about 0.5 to 1.5 weight percent of malt are mixed. In addition, minor amounts of food supplements may be added, normally being in the range of from about 0.1 to 2 weight percent in total amount, individual amounts varying from 0.01 to 0.5. Furthermore, when desired, from about 3 to 12 weight percent, more usually from about 6 to 10 weight percent of salt can be included.

The dry mixture may then be slurried with from about 2.5 to 10.0 times its weight of water to provide a slurry. The slurry is then heated in the range of about 140°–230°F, preferably from about 190°–205°F, in conventional equipment such as atmospheric, vacuum, or pressure cooking tanks, or inline agitating heaters. The time employed is sufficient to ensure the gelatinization of the cereal flour. Alternatively, the heating can be eliminated and gelatinization accomplished by drying the cold slurry on a drying surface as hereinafter described.

Drying is accomplished by any of the readily available conventional equipment such as single or double drum dryers, well known in the art. The dehydrated base material can be removed from the drying surface as a continuous sheet, usually having a thickness of about 4 to 7 mils. The particles may then be flaked in accordance with the desired size.

When it is desired to include a fruit flavoring in the instant cereal, the pregelatinized grain flakes will be employed as the medium for providing the fruit flavoring. Usually, a composition as described above, containing the flour, salt and other ingredients, will be combined with from about 2 to 4 times by weight the amount of a fruit puree to provide a final product with the addition of water, having from about 15 to 30, more usually about 25 weight percent solids. The slurry is then dried as described previously.

To provide the final cereal, the pregelatinized base flakes and the quick cooking cereal flakes are combined, with or without the addition of other additives, such as flavorings, e.g., sweetening agents, such as sucrose, food supplements, or the like. The weight ratio of the quick cooking cereal flakes to the pregelatinized base flakes will generally be in a weight ratio 1-5:1, more usually 1.5-4:1. In addition, it is desirable to add from about 0.01 to 0.10 weight percent of the total mixture of electrolytic iron as a food supplement. Where a fruit flavored pregelatinized base is employed, sugar will also be desirably added in relatively large amounts, usually from about 10 to 30 weight percent of the final composition.

In order to demonstrate the subject invention, the following examples are offered by way of illustration and not by way of limitation.

EXAMPLE 1

INSTANT OATMEAL

1. In the mixing vessel are slurried together 50 lbs. of oat flour, 5 lbs. of salt, 3.95 lbs. of calcium carbonate, 0.63 lbs. of malt, and 0.28 lbs. of vitamin mix (containing niacinamide, riboflavin, pyridoxine hydrochloride, and thiamin mononitrate), with 33 gallons of water. The slurry is then heated for a short time with mixing at a temperature of from about 140°-160°F and then fed to a conventional double drum dryer, with the drums operating at about 80 psig internal pressure. The drums rotate at 3 revolutions per minute, and the dried sheets are removed with doctor blades. The sheets are then flaked to the desired size and screened.

2. Approximately 5 lbs. of quick cooking oat flakes, prepared in accordance with conventional techniques, are blended with 0.036 lbs. of electrolytic iron, followed by adding 70 lbs. of quick cooking oat flakes and 25 lbs. of the oatmeal base flakes, and the entire mixture blended together. The size of the two different flakes is in the range of 0.05 to 0.25 inches.

EXAMPLE 2

INSTANT WHEAT CEREAL

1. Into a mixing vessel is introduced 50 lbs. of wheat flour, 5 lbs. of salt, 3.95 lbs. of calcium carbonate, 0.63 lbs. of malt, 0.50 lbs. of lecithin, and 0.28 lbs. of vitamin mix (see the mixture of Example 1) with 33 gallons of water to form a slurry. The mixture is heated to a temperature in the range of about 140°F while mixing to insure homogeneity and then dried and flaked as described above.

2. As a dry mix, 5 lbs. of quick cooking wheat flakes prepared according to conventional methods is combined with a 0.036 lb. electrolytic iron, followed by the addition of 70 lbs. of quick cooking wheat flakes, and 25 lbs. of the wheat base flakes prepared as described above. The flake size was 0.05 to 0.35 inches.

EXAMPLE 3

INSTANT WHEAT CEREAL WITH FRUIT

1. Into a mixing vessel was slurried 50 lbs. of wheat flour, 5 lbs. of salt, 3.95 lbs. of calcium carbonate, 0.5 lbs. of lecithin, 0.28 lbs. of vitamin mix (see Example 1), and 178 lbs. of banana puree with 43 gallons of water. The mix was transferred to an agitating heater at about 220°F, and then fed to a conventional double drum dryer as described previously to obtain a sheet which was then flaked.

2. Blended together dry in a mixer were 49.3 lbs. of rolled wheat flakes, 28.9 lbs. of flakes of the wheat-banana base, 0.36 lbs. of electrolytic iron, and 21.8 lbs. of sugar.

The above described cereals are prepared for eating by placing one ounce of the cereal in a bowl and adding one-half to two-thirds cup of boiling water.

The cereals prepared in accordance with this invention retain a uniform composition during storage and handling. Upon addition of water, the instant cereal rapidly reconstitutes to a homogeneous, smooth-textured porridge having the desired flavor and texture of a cooked porridge.

Although the foregoing invention has been described in some detail by way of illustration and example for purposes of clarity of understanding, it will be obvious that certain changes and modifications may be practiced within the scope of the appended claims.

What is claimed is:

1. An instant grain cereal selected from at least one of oats or wheat, comprising pregelatinized base flakes and quick cooking cereal flakes in a weight ratio of 1:1–5 as a dry mixture, said flakes being in a size of about 0.05 to about 0.25 inch cross section,
   wherein said pregelatinized base flakes are prepared by drying and flaking a slurry comprised of 80 to 95 weight percent of cereal flour and 2 to 10 weight percent mineral supplementation, with from 2.5 to 10.0 times by weight of water, said slurry being heated to a temperature in the range of 140° to 230° F.

2. An instant grain cereal according to claim 1, having from 0.01 to 0.1 weight percent of electrolytic iron.

3. An instant grain cereal according to claim 1, wherein said grain base flakes contain 3 to 12 weight percent salt.

4. An instant grain cereal selected from at least one of oats or wheat, and containing fruit comprising pregelatinized base flakes and quick cooking cereal flakes in a weight ratio of 1:1–5 as a dry mixture, said flakes being in a size of about 0.05 to about 0.25 inch cross section,
   wherein said pregelatinized base flakes are prepared by drying and flaking a slurry of a mixture having from 80 to 95 weight percent grain cereal flour and 2 to 10 weight percent calcium carbonate, with from 2.5 to 10.0 times by weight of water, and with from 2 to 4 times by weight of said mixture of a fruit puree, said slurry being heated to a temperature in the range of 140° to 230° F.

5. An instant grain cereal according to claim 4 having from 10 to 30 weight percent of sugar and 0.01 to 0.10 weight percent of electrolytic iron based on the entire composition.

6. A method for making an instant grain cereal selected from at least one of oats or wheat, which comprises:

slurrying and heating at a temperature in the range of 140° to 230° F a mixture comprising from 80 to 95 weight percent grain cereal flour, 3 to 12 weight percent salt and 2 to 10 weight percent calcium carbonate, with from 2.5 to 10.0 times by weight of water;

drying and flaking said slurry mixture to provide flakes of a size in the range of 0.05 to 0.35 inches; and dry blending said flakes with quick cooking cereal flakes of substantially the same size in a weight ratio of 1:1–5 to provide an instant cereal which reconstitutes to a porridge of desirable flavor and texture.

7. A method according to claim 6, including combining with said mixture from 2 to 4 times by weight of a fruit puree.

* * * * *